INVENTOR.
DONALD C. YOUNG
ATTORNEY

INVENTOR.
DONALD C. YOUNG

BY
ATTORNEY

United States Patent Office 3,243,279
Patented Mar. 29, 1966

3,243,279
AMMONIUM PHOSPHATE SOLIDS DERIVED FROM ANHYDROUS LIQUID PHOSPHORIC ACID
Donald C. Young, Fullerton, Calif., assignor to Union Oil Company of California, Los Angeles, Calif., a corporation of California
Original application Mar. 30, 1962, Ser. No. 183,964. Divided and this application Nov. 6, 1964, Ser. No. 409,477
6 Claims. (Cl. 71—43)

This is a divisional application of my copending application Serial Number 183,964, filed March 30, 1962, which is a continuation-in-part of my copending application Serial Number 51,047, filed August 22, 1960, now Pat. No. 3,192,013, which, in turn, is a continuation-in-part of my applications Serial Numbers 649,287, filed March 29, 1957; 666,479, filed June 18, 1957, and 672,558 filed July 18, 1957, now abandoned.

This invention relates to solid ammonium phosphate salts derived from a substantially anhydrous liquid wet-process phosphoric acid.

"Wet-process" phosphoric acid of commerce is manufactured by a process which, in essence, consists of treating phosphate rock (essentially calcium phosphate) with sulfuric acid, whereby there is formed free phosphoric acid and calcium sulfate. The latter, being insoluble, is separated from the acid by filtration. While this process is simple in concept, it is fraught with many technical difficulties and complications, and the resultant phosphoric acid product is a highly impure material, dark in color and containing relatively large amounts of dissolved sulfates and smaller amounts of fluorides, fluorosilicates and other salts of aluminum, magnesium, iron and other materials, as well as suspended organic matter. Wet-process acid is commonly produced and handled at concentrations between about 25 and 52 weight percent phosphorus calculated as the pentoxide.

Because the wet-process phosphoric acid as commonly produced contains fluorine it is unsuited for use as a source of phosphate in animal and poultry feed.

As disclosed in my copending application Serial Number 51,047, neutralization of the aforedescribed dilute wet-process phosphoric acid results in the formation of large volumes of gelatinous precipitates of iron and aluminum as well as preciptates of the other metallic impurities. In the formation of solid products, these precipitates interfere with the crystal formation of salts prepared from the acid and contribute to the formation of friable, low density solids which are hygroscopic and cake in storage.

The solid ammonium phosphate product obtained from dilute wet process phosphoric acid can not be dissolved to obtain a liquid solution of ammonium phosphate but forms a gelatinous precipitate. The use of conventional dilute wet process phosphoric acid in granulation process wherein the acid is neutralized with ammonia in a rotating drum results in a very wet reaction mass which must be subsequently dried to produce a solid product. Attempts to obviate this difficulty have, heretofore, involved the addition of extraneous dry solids, e.g., ammonium sulfate, superphosphate, triple superphosphate, etc., to the granulator to reduce the moisture content of the product. While a satisfactorily dry product can be obtained in this manner, the friable nature of the solid results in a large volume of product which is too finely divided for use and which must be recycled to the granulator for reprocessing.

It is an object of this invention to provide a method for the manufacture of ammonium phosphate salts from wet process phosphoric acid which are non-hygroscopic, hard and dense solids and which can be dissolved in water or aqua ammonia to obtain liquid fertilizers.

In my copending application Serial Number 51,047, I have discussed that when wet process phosphoric acid is concentrated to a substantially anhydrous phosphoric acid having a $P_2O_5$ content, impurity free basis between about 68.6 and 80 weight percent, that there are formed acyclic polyphosphoric acids in amounts sufficient to chelate all the non-volatile or metallic impurities contained in the acid.

I have now discovered that when this anhydrous phosphoric acid is neutralized in a manner hereinafter described, non-hygroscopic, hard, dense solids can be obtained. These solids can be dissolved in aqua ammonia or water to obtain liquid fertilizers.

I have also found that a green glass solid can be obtained by the addition of anhydrous ammonia to said anhydrous liquid phosphoric acid. This green glass is very hard, non-hygroscopic and has a slow dissolution rate in water. A very finely divided solid which is also hard, dense and non-hygroscopic can be obtained by the addition of said acid to liquid anhydrous ammonia.

I have also discovered that the neutralization of said anhydrous acid with ammonia in an otherwise conventional granulation process results in a greatly improved process and yields a non-hygroscopic solid.

It has further been discovered that the non-hygroscopic properties of the aforementioned solids depends on the degree of neutralization of the anhydrous acid and a minimum nitrogen to phosphorus content is necessary for non-hygroscopicity.

The following paragraphs briefly describe the anhydrous phosphoric acid from which the ammonium phosphate solids of my invention are derived.

The anhydrous acid is a dense, viscous liquid having a green, brown or black coloration depending on the nature of its impurities. Generally the acid contains 1 to 10 weight percent metallic impurities (expressed as oxides) comprising chiefly iron and aluminum with lesser amounts of magnesium, zinc, copper, chromium and vanadium. Also present can be organic impurities, sulfates, etc. As disclosed in my copending application, this acid is derived from wet process phosphoric acid which, in addition to the aforementioned impurities, contains fluorine and silica. A complete description of such acid and the processes by which it is made are set forth in "Phosphoric Acid, Phosphates and Phosphate Fertilizers," by H. H. Waggaman, 2nd edition, pages 174–208 (Reinhold Publishing Corp., 1952). Such acid is available commercially in both dilute and "concentrated" forms, containing about 25–35 and about 35–55 weight percent of $P_2O_5$, respectively, and either concentration may be employed. However, in most instances, it is more economical to start with the acid in the aforementioned "concentrated" form.

As disclosed in my copending application Serial Number 51,047, the anhydrous acid is prepared by subjecting the wet process phosphoric acid to a temperature above about 100° C. at superatmospheric, atmospheric or reduced pressures so as to remove the volatile impurities, e.g., silica and fluorine, therefrom. The heating can be batchwise or continuous. During the heating there is a copious evolution of white vapors comprising silica, fluorine and some water vapor from the acid. After these vapors cease to be evolved, generally within 1 to 15 minutes, the heating can be discontinued and further concentration of the acid achieved by addition of anhydrous phosphorus pentoxide or a more highly concentrated acid. Preferably, however, heating of the acid is continued to expel additional amounts of water and form the necessary amount of polyphosphoric acid. Because heating the acid substantially purifies the acid of fluorine ratio above 100, the ammonium phosphate solids derived therefrom are rendered suitable for use as a phosphate source in animal and poultry feed.

The concentration of the anhydrous acid depends primarily on the nature and amount of metallic impurities contained therein. As disclosed in my copending application, Serial Number 51,047, the minimum concentration of the anhydrous acid is obtained when the acid can be neutralized with ammonia and diluted with water to obtain a solution having a pH between about 5.5 and about 10.0 which is free of all precipitates of the metal impurities incident in the wet process phosphoric acid. Thus neutralization of a sample of the acid provides a simple inspection of the acid to permit control of the acid's concentration. The acid can also be analyzed for its phosphorus and acyclic polyphosphoric acid content and the concentration ceased when the acid contains from about 68.6 to 80 weight percent phosphorus with sufficient acyclic polyphosphoric acids to prevent precipitation of the metal impurities. Generally, for most wet process phosphoric acids, the preferred concentration of phosphorus (expressed as $P_2O_5$) on an impurity free basis is between about 69 and about 74 weight percent. The concentration of the acid must be sufficient to form an amount of acyclic polyphosphoric acids which will chelate all the insoluble metal impurities. As disclosed in my copending application, the relationship between the amount of phosphorus which must be present as acyclic polyphosphoric acid and the metal impurities is expressed by the following:

$$P_2O_5 \text{ poly} = \frac{C}{2}\left[M - \frac{K}{(2P_2O_5 \text{ ortho})^a}\right]$$

wherein C is determined by the following:

$$C = \frac{2Fe + 2Al + 12Mg + 4Zn + 3Cu + 2V}{Fe + Al + Mg + Zn + Cu + V}$$

$a$ = average valence of impurities and is determined by the following:

$$a = \frac{3Fe + 3Al + 2Mg + 2Zn + 2Cu + 5V}{Fe + Al + Mg + Zn + Cu + V}$$

The atomic symbols represent the gram atomic weights of their respective metals per 100 grams of the acid.

M = total gram atomic weight of metals per 100 grams of acid,
$P_2O_5$ ortho = total gram molecular weights of phosphorus present as orthophosphoric acid per 100 grams of acid, calculated as $P_2O_5$,
$P_2O_5$ poly = total gram molecular weights of phosphorus present as acyclic polyphosphoric acid per 100 grams of acid, calculated as $P_2O_5$, and
X is between 0 and about $0.5 \times 10^{-2}$.

My invention will now be described by reference to the drawings of which:

Figure 1:
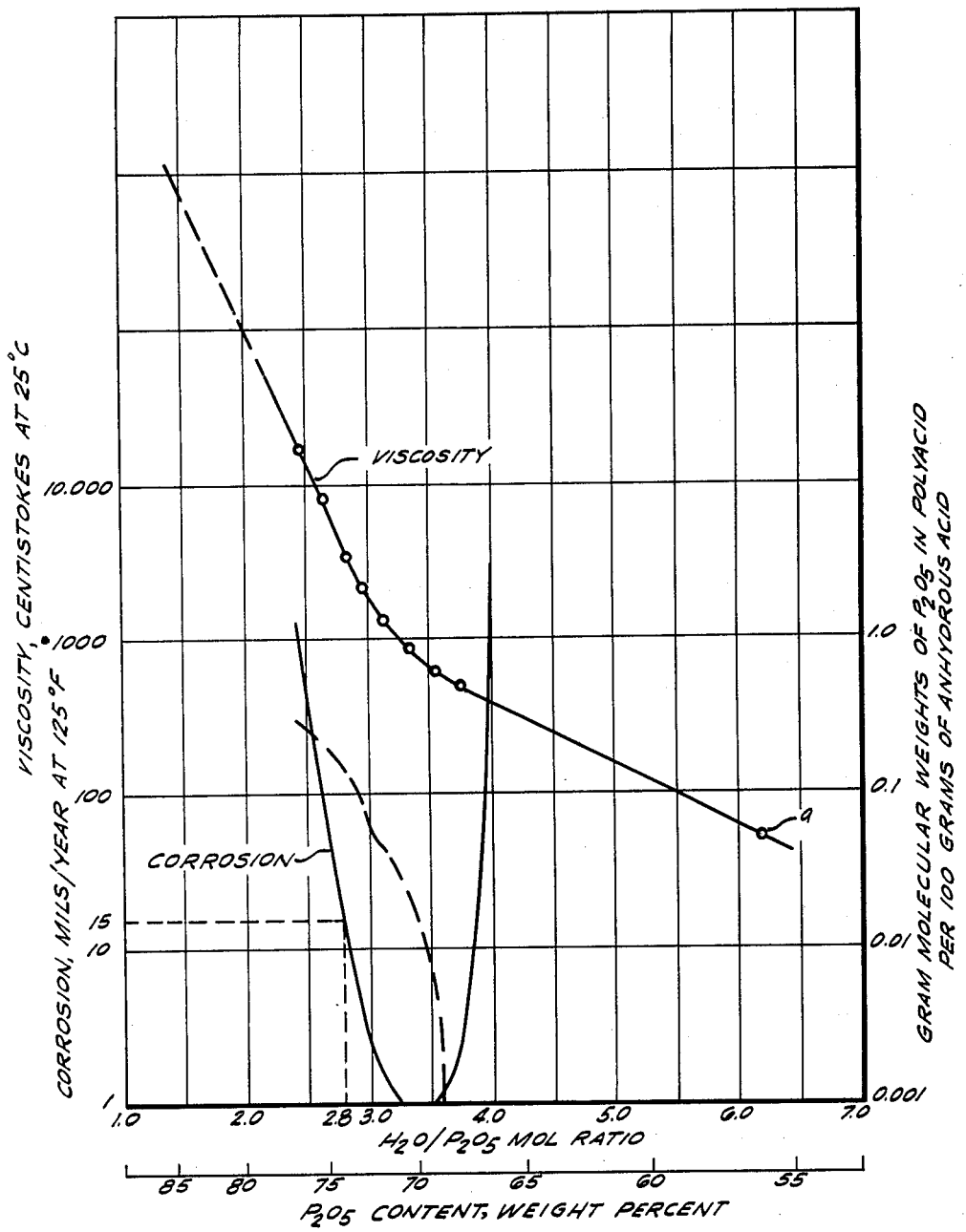
FIGURE 1 illustrates the properties of an anhydrous liquid phosphoric acid which is neutralized in accordance with my invention to yield improved solid ammonium phosphates.

Referring now to FIGURE 1, the changes encountered in the production of a substantially anhydrous phosporic acid from the wet process acid will be described. Point $a$, on the viscosity curve, represents an untreated wet process phosphoric acid containing 6.5 weight percent impurities and about 53.5 weight percent phosphorus as phosphorus pentoxide. The mol ratio of water to pentoxide of this acid is 6.2. As the acid is heated, silica, fluorine and water are expelled and the acid viscosity gradually increases as shown. Upon reaching a mol ratio of water to pentoxide of about 4.0, the corrosivity of the acid rapidly decreases until the acid is substantially non-corrosive at a mol ratio of water to pentoxide between about 3.3 to about 3.6. At a mol ratio of water to pentoxide of 3.6, the acyclic form of phosphoric acid begins to form and the acid composition in gram molecular weights of $P_2O_5$ in the polyphosphoric acid per 100 grams of total acid is shown by the broken line curve. The formation of the polyacid is accompanied by rapid increase in the acid's viscosity and followed by an increase in corrosivity of the acid. The increase in viscosity is due in part to the formation of the acyclic polyphosphoric acid and in part to the metal impurities present. Of the metal impurities, aluminum causes the greatest increase in viscosity.

As previously mentioned, the maximum concentration of my anhydrous phosphoric acid is about 2.0 mol of water per mol of pentoxide, since at greater concentrations metaphosphoric acid is formed which precipitates the impurities as insoluble metaphosphate salts. Preferably, however, the anhydrous phosphoric acid has a corrosion rate at 125° F. no greater than about 15 mils per year. From FIGURE 1 it can be seen that to maintain this corrosion rate, the acid should not be concentrated to a mol ratio of water to pentoxide of about 2.8 or less. It is noted that the polyacid begins to form in the equilibrated acid at a mol ratio of water to $P_2O_5$ of 3.6, i.e., in an acid containing about 95 weight percent orthophosphoric acid and still containing about 5 weight percent uncombined water. Although this composition has some free water, the acid is herein referred to as a substantially anhydrous acid since it is anhydrous in the sense that it has reached its maximum concentration of orthophosphoric acid and further concentration increases the polyacid content.

The amount of polyphosphoric acid in weight percent of the total phosphorus in the acid can be determined from the broken line curve of FIGURE 1. The following table summarizes the various expressions of acid concentration set forth in FIGURE 1 or calculable therefrom:

TABLE 1

| $P_2O_5$ impurity free, wt. percent | $H_2O/P_2O_5$, mol ratio | Gram mol weights of $P_2O_5$ in polyphosphoric acid | Polyphosphoric acid, wt. percent of total phosphorus |
|---|---|---|---|
| 68.6 | 3.6 | (¹) | (¹) |
| 69.3 | 3.5 | 0.0065 | 1.3 |
| 70.5 | 3.3 | 0.021 | 4.2 |
| 72.5 | 3.0 | 0.060 | 11.8 |
| 73.7 | 2.8 | 0.15 | 28.9 |
| 75.2 | 2.5 | 0.24 | 45.3 |
| 80.0 | 2.0 | 0.45 | 80.0 |

¹ Trace amounts.

The acid which has been concentrated by heating and evaporation of water at atmospheric pressure has been found to be substantially free of fluorine; typical anhydrous acids having phosphorus to fluorine ratios between about 100 and 200 can be readily derived from wet process acids having ratios between about 5 and 20.

To prepare the aforementioned green glass solid suitable for use as a fertilizer, the substantially anhydrous liquid phosphoric acid product is reacted with anhydrous ammonia at an elevated temperature, e.g., at about 150° C.–200° C. to maintain the reaction mixture in the liquid state. When operating batchwise, the mixed acid product is charged to a suitable vessel and heated to a temperature of about 100° C.–225° C. Anhydrous ammonia is then gradually introduced into the body of heated acid in such amount that an aqueous solution of the reaction product has a pH value between about 5.5 and about 10.0, preferably between about 6.5 and about 8.5. In order to maintain the reaction temperature high enough to avoid solidification of the product, it may or may not be necessary to add heat to the reaction vessel. The reaction itself is exothermic, and by suitably designing and insulating the reaction vessel it is possible to maintain the desired reaction temperature utilizing the exothermic heat of reaction as the sole source of heat. Otherwise, the reaction vessel is provided with means for supplying heat thereto from an outside source.

The immediate product of the reaction is a hot liquid material containing the majority of the metallic impurities originally present in the crude wet process acid. If allowed to cool to atmospheric temperature, such material solidifies to a substantially non-hygroscopic solid which can be granulated by conventional means to form a substantially free-flowing solid ammonium phosphate fertilizer suitable for direct application to the soil by spreading, drilling, dusting, etc. Such solid product, however, is but slowly dissolved in cold water.

Other anhydrous ammoniation techniques can, of course, be employed. If desired, lower temperatures can be used by use of an organic reaction medium which has a solubility for the anhydrous phosphoric acid or ammonia. Examples of suitable mediums are the various low boiling hydrocarbons, e.g., pentane, hexane, isohexane, heptane, isooctane, nonane, isodecane, benzene, toluene, etc., oxygenated solvents such as butanol, isopropanol, acetone, methyl ethyl ketone, etc. The anhydrous acid is dissolved or dispersed in the organic medium and ammonia is thereafter introduced to neutralize the acid. The resultant solid ammonium phosphate settles out of the reaction medium and is readily removed therefrom. The exothermic heat of reaction is conveniently removed by refluxing of the organic medium. If desired, of course, water-in-oil emulsification agents can be used to enhance the acid dispersion in the organic medium.

Figure 2:
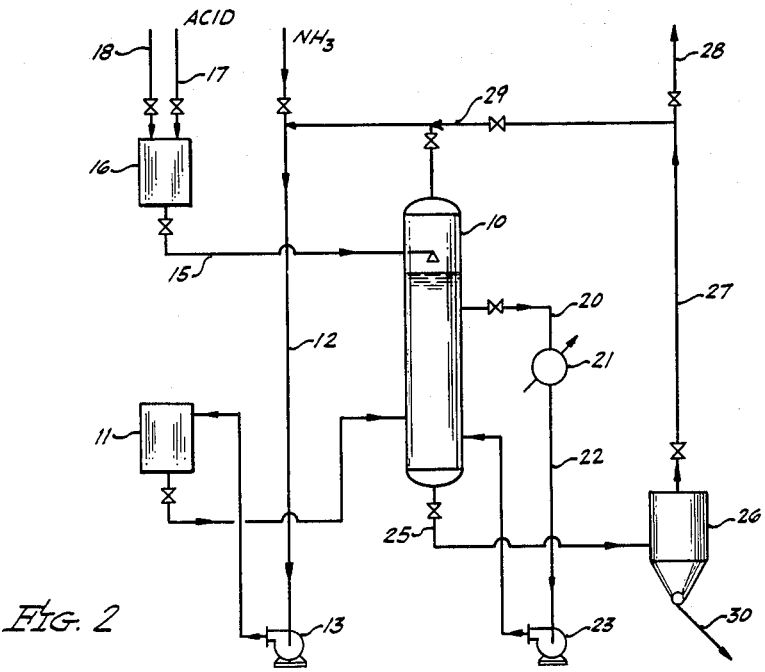
FIGURES 2 and 3 illustrate neutralization processes of my invention.

FIGURE 2 illustrates another method for the anhydrous ammoniation of an anhydrous wet process phosphoric acid. In this method, the acid is introduced into a body of ammonia maintained under liquefaction pressures. The product so produced is in a finely divided state, requiring no subsequent crushing or grinding. Like the green glass product obtained by the addition of amounts to a body of the acid, it too is non-hydroscopic. The finely divided product, however, has a higher melting point and can be fused without detectable losses of ammonia.

Referring now to FIGURE 2, anhydrous ammonia, preferably in liquid state, is maintained in reactor 10 by a supply from high pressure accumulator 11 which in turn receives ammonia from line 12 and pump 13. Into the upper portion of reactor 10, preferably above the liquid level therein, is supplied the anhydrous liquid wet process phosphoric acid from line 15. The acid is supplied from pressure accumulator 16 which alternately is charged with acid from 17, pressurized with an inert gas, $N_2$, air, etc. through 18 and then discharge into the reactor.

The anhydrous ammonia in reactor 10 is preferably maintained at a temperature below its critical temperature of 132° C., although temperatures between about 75° and 500° C. can be employed. It is preferred to use temperatures between about 100° and 132° C., the lower limit being desired to insure an adequate rate of reaction. To maintain this temperature, ammonia is withdrawn by line 20, cooled in exchanger 21 and returned through line 22 by pump 23. In general, reactor 10 is maintained under liquefaction pressures between about 2 and about 11 atmospheres, preferably between about 5 and 10 atmospheres.

A slurry of reaction product in liquid ammonia is intermittently or continuously withdrawn at 25 and passed to flash zone 26 where the ammonia is vaporized and removed by line 27 for venting, line 28, or recycling, line 29. The solid reaction product is removed at 30 as a finely divided non-hygroscopic solid. Products so obtained have a nitrogen content between about 6 and 22 weight percent and a phosphorus content between about 45 and 65 weight percent, expressed as $P_2O_5$.

The exact nature of the ammonium phosphate products is not known with certainty. It is believed, however, that the major proportion of the product is a mixture of ammonium orthophosphates and ammonium polyphosphates with the presence of some P–N bonds, e.g., phosphoamide and phosphoimide compounds.

Figure 3:
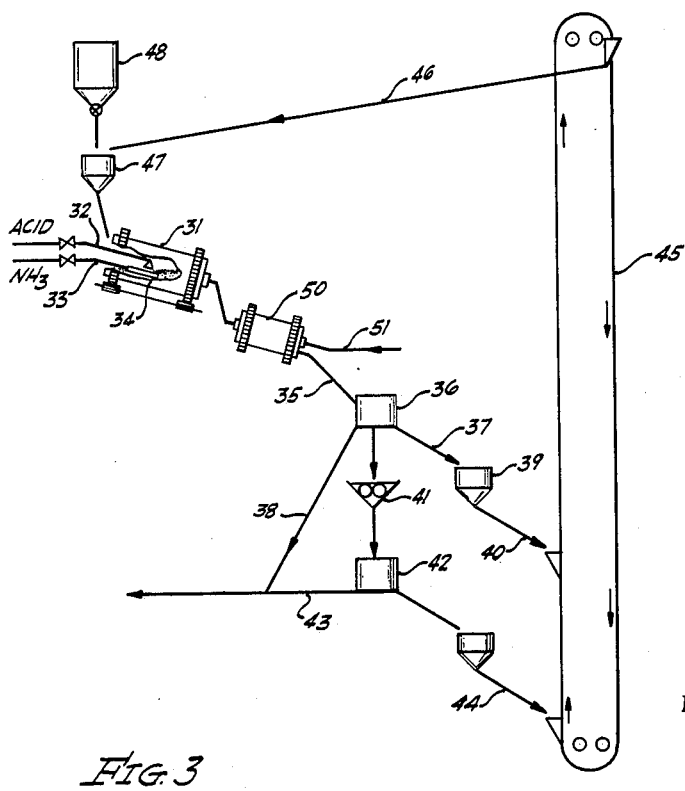

As previously mentioned, the anhydrous wet process phosphoric acid can also be ammoniated in a granulator, i.e., a rotating drum to yield a hard dense solid product. When conventional wet process acid is processed, a gelatinous sludge is produced by such ammoniation which upon drying yields a friable solid containing large amounts of too finely divided solids, which must be recycled. In contrast, the solids obtained by ammoniation of an anhydrous acid having a $P_2O_5$ content between about 69 and 80 weight percent, impurity free basis, are hard, dense solids which are non-hygroscopic, FIGURE 3 illustrates a suitable granulation method wherein the acid is sprayed through line 32 onto a bed of solid reactants in granulator 31. Anhydrous or aqueous ammonia is introduced by line 33 into sparger 34 positioned beneath the solids in the granulator. The granulator is rotated in a conventional manner to agitate the reactants. The solid product overflows into cooling and drying drum 50 where it is cooled and dried by dry air stream 51. The dried product passes by line 35 to screens 36 which recover the desired size particles, line 38; which segregate a recycle stream of fines; line 37 to hopper 39, and line 40; and which separate the coarse solids for crushing by grinder 41. The ground solids are again screened at 42, the desired size range recovered at 43 and the fines recycled by line 44 to elevator 45 and line 46 to a solids feed hopper 47.

The anhydrous acid and ammonia are supplied to the granulator at rates to obtain a final product having a nitrogen to phosphorus (as $P_2O_5$) weight ratio greater than about 0.14 to impart non-hygroscopicity to the product. In general, recycle rates of finely divided solid material can be between about 0.5 to 10 parts by weight per combined weights of anhydrous acid and ammonia; between about 1 and 5 parts per part of combined weights is preferred.

The use of anhydrous ammonia is preferred; however, aqua ammonia can be employed if desired. The effect of water addition is to require a greater recycle rate of solids; between about 4 and 10 parts per part of combined weight being necessary when aqua ammonia is used. The temperature of granulation can be varied up to about 225° C. Temperatures above about 225° C. at atmospheric pressure should be avoided since at this temperature there exists a substantial rate of conversion to metaphosphates. Since the metaphosphates are insoluble, subsequent dissolution of the solid product would not be possible. Preferably, the temperature in the granulator is maintained below the melting point of the solid which is about 180° to about 200° C. Therefore the preferred temperature of granulation is between about 70° and about 180° C.

If desired, mixed fertilizers can be obained by introduction of other solid salts from hopper 48 such as ammonium sulfate, ammonium nitrate, potassium chloride, superphosphate, triple superphosphate, etc. These solids and the method of their preparation form the subject matter described and claimed in my copending application Serial Number 183,964.

Also if desired, a high analysis fertilizer can be obtained by admixing the anhydrous phosphoric acid with phosphate rock, storing or "denning" the acidulated solid for several days to weeks and thereafter ammoniating the solid in a granulator. Typical ratios of acid to rock are from 0.1 to 10 parts per part by weight; preferably between about 1 and about 5 parts per part.

The use of anhydrous ammonia is preferred in the granulation; however, the temperature in the granulator can be maintained above 212° F., preferably between about 212° and about 225° F. and consequently any water introduced with the ammonia will be flashed off. Because the water removal may subtract more heat than is available from the reaction exotherm, external heating may be required. To avoid external heating, therefore, I prefer to employ anhydrous ammonia.

Figure 4:
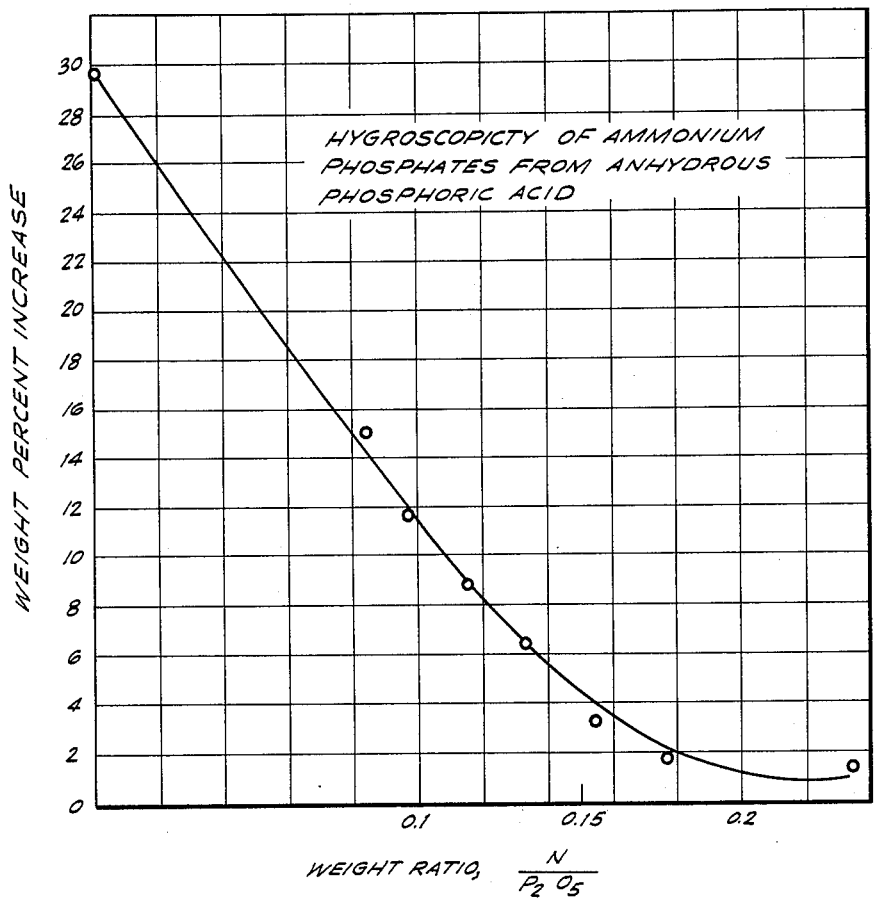
FIGURE 4 illustrates the hygroscopic properties of the ammonium phosphates of my invention.

The hygroscopic property of the ammonium phosphate solids of my invention is depicted in FIGURE 4. This curve was obtained by exposing samples of ammonium phosphates derived from an anhydrous wet process phosphoric acid to a constant 50% relative humidity atmosphere for twelve days to insure that the samples reached an equilibrium state. The weight percent increase in sample weight was recorded and is plotted against the weight ratio of nitrogen to phosphorous as $P_2O_5$ of the sample. In general, the samples studied had a $P_2O_5$ content between about 55 and 65 weight percent and a nitrogen content between about 0.02 and 14 weight percent.

As FIGURE 4 demonstrates, it is necessary to achieve a nitrogen to phosphorus (as $P_2O_5$) weight ratio of at least about 0.14 to impart a non-hygroscopic nature to the solids.

The solid ammonia-anhydrous phosphoric acid products of my invention can be readily dissolved in water or aqua ammonia to yield clear aqueous solutions containing up to about 60 weight percent combined nitrogen and phosphorus. In general, solutions of about "11–33–0" can be obtained which have salting out temperatures below about 5° C. and which contain from 1 to 10 weight percent metal impurities, iron, aluminum, magnesium, etc., which were originally present in the dilute acid. In contrast, attempts to dissolve the solid product obtained by ammoniation of dilute wet process phosphoric acid are unsuccessful and result in a semi-solid paste of gel.

The preferred dissolution technique comprises the addition of my solid ammonium phosphates to water or aqua ammonia while maintaining the pH of the solution between about 6.0 and 8.0, preferably 6.5 and 7.5 by the simultaneous addition of ammonia or aqueous ammonia. If desired, the solid can be dissolved in water, however to maintain a stable solution, the pH of the solution should thereafter be adjusted to the aforementioned limits to prevent the hydrolysis of the polyphosphates contained in the solid. Failure to so adjust the pH will result in their hydrolysis with consequent formation of the gelatinous iron and aluminum precipitates.

The following examples will illustrate various ways in which the principle of the invention may be applied, but are not to be construed as limiting the invention.

*Example 1*

About 1000 parts by weight of wet process phosphoric acid containing about 53 weight percent of $P_2O_5$ content were charged to a vessel and therein slowly heated with an electric heating mantle and with rapid stirring to a temperature of about 195° C. During the heating there was a copious evolution of white vapors from the acid, which evolution substantially ceased within about 5 minutes after the temperature reached 195° C. The water vapor volatilized from the acid was condensed and measured 181 milliliters. While still maintaining the temperature in excess of 160° C., anhydrous ammonia was slowly added in an amount sufficient to neutralize the acid. A sample was withdrawn from the reaction mixture and allowed to cool to room temperature, whereupon it solidified to a substantially non-hygroscopic mass which had a slow dissolution rate in cold water. When the dilute wet process acid is neutralized with anhydrous ammonia, the reaction product is a thick gelatinous semi-solid paste.

*Example 2*

About 500 parts by weight of wet process phosphoric acid containing about 53 weight percent of $P_2O_5$ content were charged to a vessel and therein slowly heated with rapid stirring to a temperature of about 185° C. During the heating, white vapors were evolved from the acid. The water vapor in the volatilized portion was condensed and comprised 75 parts. While maintaining said heating, 120 parts by anhydrous ammonia were slowly added, the rate of ammonia addition being controlled to maintain a relatively constant temperature. During the ammoniation, the temperature rose to about 197° C. and 60 additional parts of water were removed. The reaction mass after ammoniation was sampled and the sample upon cooling to room temperature was a hard, dense, green solid having about 13 percent by weight of nitrogen and 55 percent by weight of phosphorus calculated as $P_2O_5$. This sample was non-hygroscopic and had an initial melting point of 173° C. and a final melting point of 200° C.

*Example 3*

A glass vessel is chilled in a Dry Ice bath and 42.5 grams of anhydrous liquid ammonia are added. Thereafter 23.7 grams of an anhydrous liquid phosphoric acid is slowly added. The acid has the following analysis:

| | Weight percent |
|---|---|
| $P_2O_5$ | 70.9 |
| $H_2O$ | 21.9 |
| Impurities (total) | 7.2 |
| $Fe_2O_3$ | 1.3 |
| $Al_2O_3$ | 2.6 |
| Others, ZnO, MgO, CaO | 3.3 |

Upon contact with the liquid ammonia, the phosphoric acids forms hard brittle solid droplets. The glass vessel is placed in a pressure bomb which is closed and purged with argon. The bomb is then placed on a rocker and slowly heated to about 482° F. over a two-hour period. The heating was continued at 482° F. for several hours during which time the bomb pressure reached 900 p.s.i.g. Upon cooling to room temperatures, the bomb pressure was 575 p.s.i.g. The pressure was released, the bomb opened and its contents found to comprise a finely divided solid which was very hard, dense and non-hygroscopic. Forty percent of the solid passed a 40 mesh screen. The nitrogen and phosphorus ($P_2O_5$) content of the solid were 18.3 and 52.1 weight percent respectively. Upon heating to 165° C. the solid began to melt and was completely melted at 217° C. No evolution of ammonia was detected during the melting of the solid.

The preceding examples are intended solely to illustrate a mode of practice of my invention and to demonstrate some of the results obtainable. It is not intended that my invention be unduly limited to only the illustrations, but rather that the invenion be defined by the steps and their equivalents of the following method claims and the components and their obvious equivalents of the following composition claims.

I claim:

1. The method of preparing a hard non-hygroscopic ammonium phosphate solid from a wet process phosphoric acid having a concentration between about 25 and 55 weight percent $P_2O_5$ and containing from 1 to about 10 weight percent, calculated as the oxides, of incidental impurities comprising iron and aluminum which comprises:

concentrating said wet process phosphoric acid until its phosphorus content is between about 69 and about 80 weight percent, expressed as $P_2O_5$ on an impurity free basis, and until the acyclic polyphosphoric acid content of said acid comprises between about 1.0 and 80 weight percent of the total phosphorus in said acid and is sufficient to retain said metallic impurities in soluble form; and thereafter neutralizing at a temperature between about 75° and 500° C. the concentrated phosphoric acid with sufficient ammonia to provide at least 0.14 part nitrogen per part of phosphorus (as $P_2O_5$) in said solid product;

said solid product having a phosphorus content (as $P_2O_5$) between about 40 and about 65 weight percent, a nitrogen content between about 6 and about 22 weight percent; and containing in soluble form between about 1 and 10 weight percent of said metallic impurities originally present in said wet process phosphoric acid.

2. The method of claim 1 wherein said neutralization is performed by:

adding said concentrated phosphoric acid to an excess amount of liquid anhydrous ammonia;

subjecting the admixed reactants to a temperature between about 75° and 500° C., and a pressure between about 2 and about 11 atmospheres; and thereafter cooling the reactants and separating said hard non-hygroscopic ammonium phosphate solid as a reaction product.

3. The method of claim 1 wherein said neutralization is performed by:

adding ammonia to said concentrated phosphoric acid at a temperature between about 150° and 225° C.; and thereafter cooling the reactant mass and crushing the resultant solid to obtain said hard non-hygroscopic ammonium phosphate solid.

4. The method of claim 1 wherein said neutralization is performed by:

maintaining a bed of solid ammonium phosphate product at a temperature between about 70° and about 180° C.;

simultaneously introducing said concentrated phosphoric acid onto said bed of solids and introducing ammonia into said bed of solids; and withdrawing a portion of said solid bed as said hard non-hygroscopic ammonium phosphate solid.

5. The manufacture, from ammonia and wet process phosphoric acid having a concentration between about 25 and 55 weight percent $P_2O_5$, of a hard, dense, non-hygroscopic solid containing nitrogen and phosphorus that comprises:

(a) heating said wet process phosphoric acid to a temperature above about 120° C. while removing gaseous products evolved therefrom to thereby concentrate said acid, continuing said concentration until said acid is sufficiently concentrated that when neutralized with ammonia and dilution with water, a clear aqueous solution of ammonium phosphates free of precipitates will be obtained;

(b) thereupon discontinuing said heating and concentrating to obtain a concentrated wet process phosphoric acid and thereafter neutralizing said concentrated wet process phosphoric acid at a temperature between about 150° and 200° C. with anhydrous ammonia, the amount of said ammonia being sufficient to obtain a product when dissolved in water has a pH between about 5.5 and about 10.0; and (c) recovering said hard, dense, non-hygroscopic solid as the neutralized product from step (b).

6. The solid produced by the method of claim 5.

References Cited by the Examiner

UNITED STATES PATENTS

| | | | |
|---|---|---|---|
| 2,128,182 | 8/1938 | Fiske | 23—165 |
| 2,272,402 | 2/1942 | Du Bois | 23—165 |
| 2,792,286 | 5/1957 | Wordie et al. | 23—107 |
| 2,806,773 | 9/1957 | Pole | 71—64 |
| 2,887,362 | 5/1959 | Lee | 23—165 |
| 2,893,858 | 7/1959 | MacDonald et al. | 71—64 |
| 2,895,799 | 7/1959 | Le Baron et al. | 23—165 |
| 2,897,053 | 7/1959 | Svanor | 23—165 |
| 2,902,342 | 8/1959 | Kerly | 23—107 |
| 2,917,367 | 12/1959 | Hodges | 23—165 |
| 3,057,711 | 10/1962 | Reusser et al. | 23—107 X |

DONALL H. SYLVESTER, *Primary Examiner.*

A. SCIAMANNA, H. CAINE, *Assistant Examiners.*